(12) United States Patent
Au et al.

(10) Patent No.: US 9,738,225 B1
(45) Date of Patent: Aug. 22, 2017

(54) ELECTRONIC DISPLAY PANELS FOR BUSES

(76) Inventors: Kammy Au, San Gabriel, CA (US);
Barry Hartsfield, Beverly Hills, CA (US)

( * ) Notice: Subject to any disclaimer, the term of this patent is extended or adjusted under 35 U.S.C. 154(b) by 0 days.

(21) Appl. No.: 12/198,077

(22) Filed: Aug. 25, 2008

Related U.S. Application Data

(63) Continuation-in-part of application No. 11/033,252, filed on Jan. 7, 2005, now Pat. No. 7,449,998.

(51) Int. Cl.
*G08B 5/00* (2006.01)
*B60R 1/12* (2006.01)

(52) U.S. Cl.
CPC ...................................... *B60R 1/12* (2013.01)

(58) Field of Classification Search
USPC ............................................... 340/815.4, 468
See application file for complete search history.

(56) References Cited

U.S. PATENT DOCUMENTS

| | | | | |
|---|---|---|---|---|
| 6,236,330 | B1* | 5/2001 | Cohen | 340/691.6 |
| 6,812,851 | B1* | 11/2004 | Dukach et al. | 340/815.4 |
| 7,184,093 | B2* | 2/2007 | Manning | 348/445 |
| 7,444,771 | B2* | 11/2008 | Raccah | 40/466 |
| 2003/0167105 | A1* | 9/2003 | Colborn | 700/295 |
| 2006/0058897 | A1* | 3/2006 | Senda et al. | 700/22 |
| 2006/0077414 | A1* | 4/2006 | Lum et al. | 358/1.13 |
| 2006/0097577 | A1* | 5/2006 | Kato et al. | 307/10.1 |

* cited by examiner

*Primary Examiner* — Travis Hunnings
(74) *Attorney, Agent, or Firm* — Tommy S F Wang; Wang IP Law Group, P.C.

(57) ABSTRACT

A display system mounted on one or more sides of a public transportation vehicle (e.g., a bus). The display system is interfaced with a portable computing device (e.g., a personal data assistant), where the portable computing device provides updated messages to be displayed on a display panel. The display system includes at least one display panel mounted on one side of a bus, facing outwards such that the display panels may be readily seen when the bus goes around. The display panel is mainly for displaying messages provided by the portable computing device but also for displaying default messages in a local storage device.

10 Claims, 4 Drawing Sheets

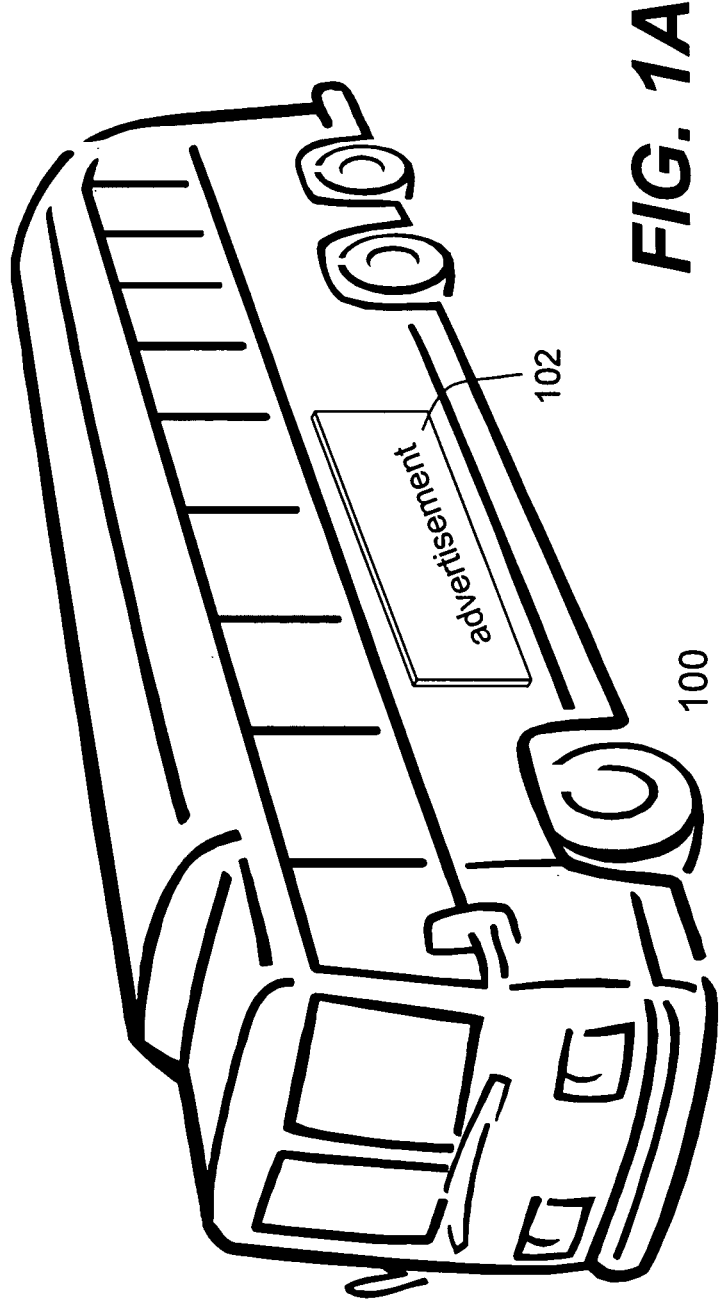

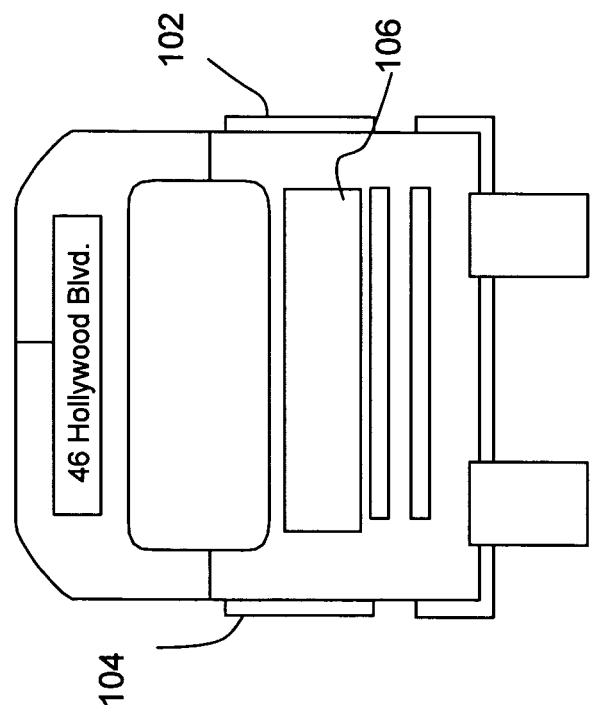

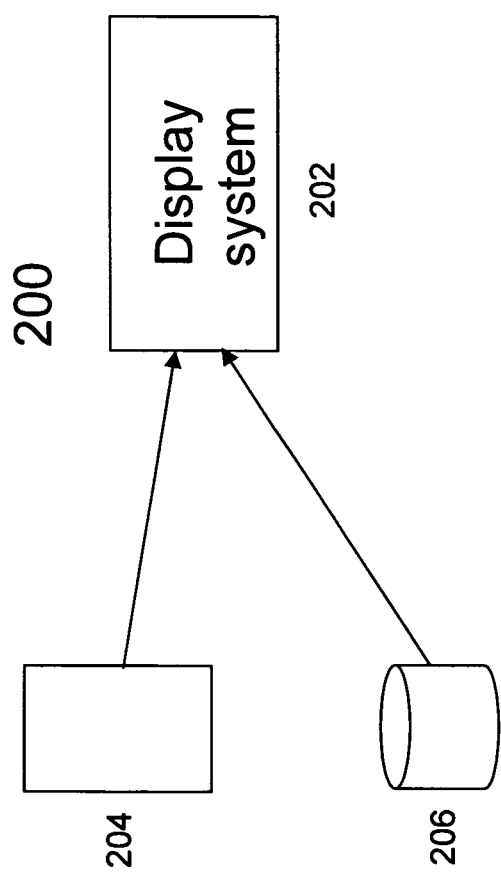
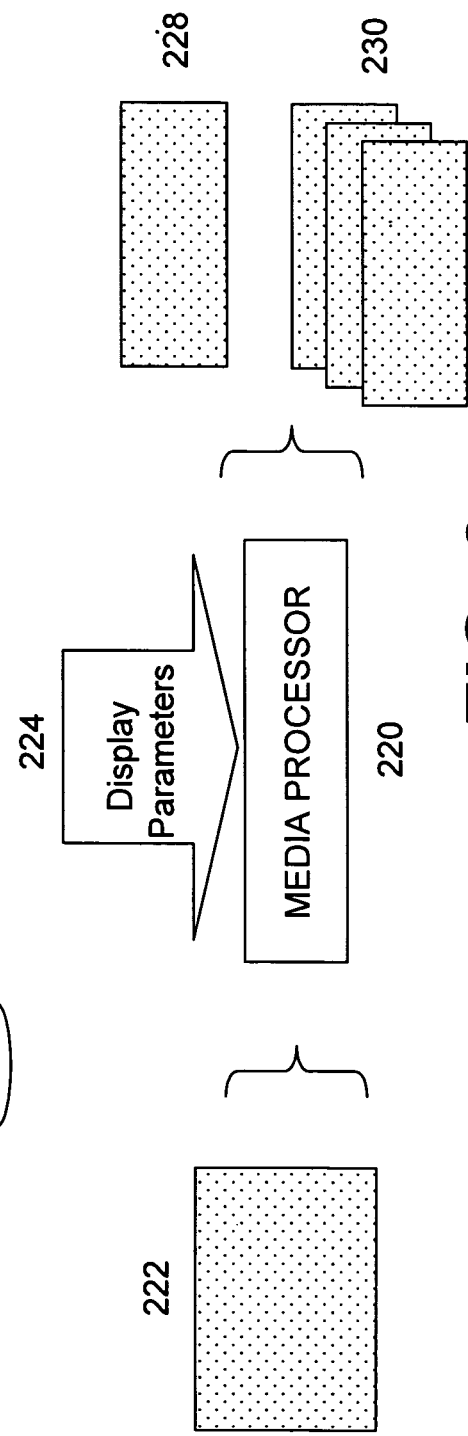

ELECTRONIC DISPLAY PANELS FOR BUSES

CROSS-REFERENCE TO RELATED APPLICATION

This application is a continuation-in-part of U.S. patent application Ser. No. 11/033,252 filed on Jan. 7, 2005, now U.S. Pat. No. 7,449,998.

BACKGROUND OF THE INVENTION

Field of the Invention

The present invention relates to the area of presenting information for advertising or other purposes, and more specifically to a method and system for displaying information on both sides of a public transportation vehicle, at least some of the displayed information, at the time of being displayed, pertaining to the location of the moving vehicle.

Description of the Related Art

Studies show that people notice words and pictures displayed on moving objects, such as trucks more than those on stationary billboards. That is why nearly all companies use their trucks to promote intended messages. For example, delivery trucks by United Parcel Service (UPS) are all in brown color and carry the company logo as well as service messages while moving trucks from U-haul are all in orange and white colors and imprinted with different sizes of available trucks and corresponding prices. The purpose of using trucks as moving billboards is to make a company stand out and get noticed in traffic areas. Similarly, advertisements or any commercial messages on moving vehicles create an eye level impact so as to increase awareness and overall positive impression for the advertiser (e.g., a company).

The moving advertisements on moving vehicles have proven to be as an effective advertising medium. Innovations in making such moving advertisements include vehicles (e.g., buses) entirely wrapped in electrostatic marking film carrying advertising messages. However, the moving advertisements on vehicles are stationary and sometimes permanent. It is generally difficult to change any messages or contents on the advertisements from time to time.

Many public transportation vehicles (buses) carry such stationary advertising messages, often in paint or adhesive films. Changing or updating any of these advertising messages would be considered as a major task and costly. Accordingly, there is a great need for solutions conveying information dynamically from a moving bus to viewers, wherein the information is conveyed based on a location of the moving vehicle and more related to viewers in the location and/or the time at which the information is seen.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The invention pertains to a display system mounted on one or more sides of a public transportation vehicle (e.g., a bus). The display system is configured to display messages, wherein the messages may be in form of static or moving graphics, texts, animation or video, and include a set of advertising messages or location-based messages. The display system is interfaced with a portable device (e.g., a personal data assistant), where the portable device provides updated messages to be displayed on the display panels.

The display system includes at least one display panel that may be mounted on any one side of a bus and/or two display panels, each mounted on one side of a bus, facing outwards such that the display panels may be readily seen when the bus goes around. The display panels are for displaying messages provided by a portable device. Depending on implementation, the display panel in use may be of liquid crystal display (LCD) or light emitting diode (LED). The display panels may also be used for displaying emergency messages when needed.

The display system may also include smaller display panels mounted inside of the bus for viewing by passengers. The smaller display panels and the display panels mounted outside of the bus may be configured to display identical or different messages. To avoid creating sharp lighting contrast in or disturbing a quiet neighborhood, a sensor is provided to sense the ambient lighting condition to control the brightness of the display panels mounted outside of the bus. In addition, a power management is provided to ensure that some or all of the display panels as well as the smaller display panels are turned off when the bus has stopped for a predefined period.

The present invention may be implemented in different forms, such as a method, a system and a bus. According to one embodiment, the present invention is a system for displaying messages, the system comprising: a bus; and a display system provided for the bus, the display system including at least two display panels respectively mounted on both sides of the bus, each of the display panels configured to display messages provided from a portable computing device that is demountable and carried away to be synchronized with a base station for updating the messages, wherein the messages include a set of advertising messages.

One of the objects, features, advantages, benefits of the present invention is to provide a solution for conveying media information to viewers, the solution employs a bus mounted with a display system. When the bus goes around in traffic areas, relevant information displayed on the display system may be readily seen.

Other objects, features, advantages, benefits of the invention will become more apparent from the following detailed description of a preferred embodiment, which proceeds with reference to the accompanying drawings

BRIEF DESCRIPTION OF THE DRAWINGS

The present invention will be readily understood by the following detailed description in conjunction with the accompanying drawings, wherein like reference numerals designate like structural elements, and in which:

FIG. 1A shows a bus on one side of which is mounted with a display panel;

FIG. 1B shows a rear side of a bus on which is mounted with a display panel;

FIG. 2 shows a configuration of providing media information to a display system used on a bus from a portable computing device or a storage device;

FIG. 3 shows an example of processing a media content in a media processor; and

DETAILED DESCRIPTION OF THE INVENTION

Figure 4:
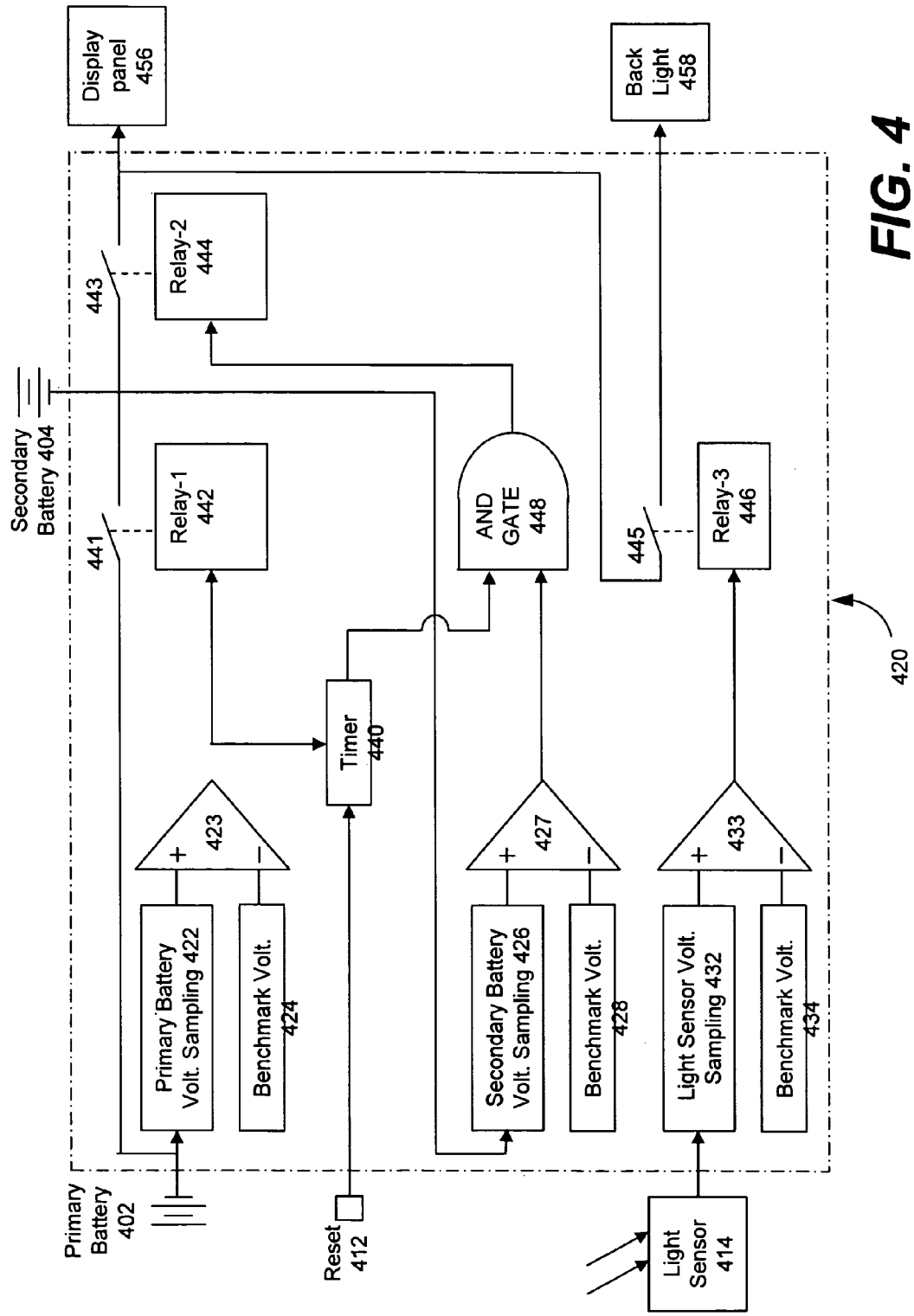
FIG. 4 shows an exemplary circuit used to energize or control a display system used for a bus.

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Referring now to the drawings, in which like numerals refer to like parts throughout the several views. FIG. 1A shows a bus 100 on one side of which is mounted with a display panel 102. In general, a display system for the bus 100 includes at least one display panel that may be mounted on any side of the bus. FIG. 1B shows the rear side of the bus on which a display panel 106 is mounted. Depending on implementation, the display panel or panels may be mounted onto or integrated with one side of the bus. In one embodiment, a display system includes two or three display panels as shown in FIG. 1B. Two display panels 102 and 104 may be disposed respectively on both sides of the bus (e.g., above or below the windows). If there is a third one 106, it can be mounted onto the rear side of the bus. Preferably, the display panels are identical in size and configured to display identical content. The display system may also include another display panel mounted on the back of the bus. Depending on implementation, each of the display panels may be configured to display identical or different content.

According to one embodiment, the display panels are may be liquid crystal display (LCD) panels, light emitting diodes (LED) panels or organic light emitting diodes (OLED) panels. Additionally, the display panels and/or display plates may be protected by a tinted or clear polycarbonate screen for protection from harmful UV rays and damages from vandalism or accident.

The display panels are provided to display media information that may include, but may not be limited to, images, graphics, animations, video and texts. The media information may be provided locally or remotely. As will be further described below, locally provided media information is typically from a storage device integrated or enclosed in the display system while updated media information is provided from a mountable and portable device.

FIG. 2 shows a configuration 200 of providing media information to a display system 200 used on a bus. The media information may be provided from either one of a portable computing device 204 and a local storage device 206. In one embodiment, the portable computing device 204 is removably connected or may be removed by a driver or conductor of the bus to take with him/her when necessary to a base station for updating the messages therein. In one application, all portable computing devices for buses on a specific route are updated at a base station that assembles the messages that need to be displayed around the route the buses go for a specific time period (e.g., a day or a week).

In another embodiment, the portable computing device 204 is equipped with network capability to communicate with a base station to receive updated messages for display on the display panels. Depending on implementation, the network capability may work with a wireless communication protocol (e.g., WiFi or WiMAX) or a cellular communication protocol (e.g., 3G, GSM or CDMA). The messages to be displayed may be pushed to the portable computing device 204. Alternatively, the portable computing device 204 is configured to pull the messages at a specific time.

When a portable computing device 204 is not provided or connected to the display system 200. In one embodiment, the local storage device 206 provides default messages to be displayed on the display system 200. The default messages, depending on implementation, may include a bus schedule, a public announcement or information of non-commercial nature. The local storage device 206 may be a portable storage device (e.g., USB memory stick). Contents in the local storage device 206 may also be updated via a computing device to include messages of all nature. According to one embodiment, unless the portable computing device 204 is not provided, the display system 200 is configured to display the default messages in the local storage device 206.

In one embodiment, there are a number of smaller display panels in the display system 200. These smaller display panels are mounted inside of a bus to be viewed by the passengers riding on the bus. Depending on the configuration of the display system 200, these smaller display panels may be synchronized with the display panels mounted outside of the bus or display different contents.

In one embodiment, the aspect ratio of the display panels mounted on the sides of the bus is different from that of the smaller display panels mounted inside of the bus. In general, the outside display panels are relatively narrower and wider than that of the inside displays. Accordingly, there is a mechanism provided to change the aspect ratio of or modify an image to be displayed on the outside display panels.

FIG. 3 shows that an original content 222 is in a first size and the processed content 228 is in a second size. The original content 222 may be provided to fit perfectly on one type of display panel (e.g., an aspect ratio of 4:3 or 16:9 commonly seen in a LCD display panel). The media processor 206 is configured to process the original content 222 in accordance with display parameters 224 pertaining to the display panels or other desired artistic effects. The display parameters 224 include at least information about width and height of the display panels. Subsequently, processed content is produced in a format 228 or 230. According to one embodiment, the format 228 is simply for a standard display. Like a television or computer display monitor, the standard display means herein to display the original content in fidelity. Conversely, the format 230 is a format that includes some artistic effects in the original content. For example, the height of the original content is bigger than that of the display panel, the processed content in format 230 is now in several frames that can be shown sequentially or in a rolling manner. Another example of the format 230 may include special artistic effects in the processed content, where these special artistic effects may be very suitable for much narrowed display panels suitable for one side of a bus (e.g., left or right side of a bus or a back of the bus).

When a bus mounted with several panels goes around in a residential area in the evening, these panels are typically bright and could disturb the quietness of the area. According to one embodiment, there is a sensor provided to control the brightness of the display panels. Those outside panels are controlled by a circuit in responding to the sensor to adjust the brightness of the display panels. When the sensor senses that ambient light is dim, the brightness of the display panels is adjusted low accordingly. Conversely, when the sensor senses that ambient light is bright, the brightness of the display panels is adjusted high accordingly. Alternatively, the brightness of the display can be controlled manually, for example, by the driver of the bus.

Referring now to FIG. 4, there shows an exemplary circuit of a power management unit 420 configured to control the power supply to a display panel 456. In one embodiment, a power source to energize the display panel 456 is provided by a battery of the vehicle. In another embodiment, there are two power sources: a primary battery 402 and a secondary battery 404. The primary battery 402 is the main battery for the vehicle. The secondary battery 404 is a backup battery when the primary battery 402 needs to be preserved to start or restart the vehicle engine. The power management unit 420 is configured to select which one of the power sources to energize the display unit by detecting a state of the vehicle engine and states of the primary 402 and/or secondary battery 404. In addition, the power management unit 420 is configured to automatically turn up or down the illumination intensity of the display system in response to detected ambient light conditions. It is desirable to avoid keeping the illumination low when the vehicle enters a neighborhood of low lighting condition, and bring up the illumination intensity when the vehicle is in the vicinity of bright areas.

When the engine of the vehicle is started and running, the display panel 456 (e.g., LCD and/or LED display screen) receives power from the engine (i.e., alternator) of the vehicle, and both the primary 402 and the secondary 404 batteries are being charged. The primary battery voltage sampling 422 receives and detects a higher electric voltage (e.g., 13.5 Volts) than a benchmark voltage 424 (e.g., 5.1 Volts) from the primary battery 402. The secondary battery voltage sampling 426 also receives and detects a higher voltage (e.g., 10 Volts) than the benchmark voltage 428 (5.1 Volts) from the secondary battery 404. As a result, power with sufficient electric voltage is passed by a controller 423 to a first electric relay 442, which closes or turns on a first switch 441 in providing power to the display unit 456. The power with sufficient high voltage is passed by the controller 427 to an AND gate 448. In addition, the power from the primary battery 402 is also sent through a timer 440 to the AND gate 448. Then the power is sent to a second electric relay 444, which closes or turns on a second switch 443 in providing power to the display unit 456.

Once the vehicle engine is turned off, the primary battery voltage sampling block 422 detects a lower voltage than the benchmark voltage 424, the low voltage electric power triggers the first relay 442 to open or turn off the first switch 441. The lower voltage also causes the timer 440 to start its clock for a pre-determined time (e.g., one hour) and the display panel 456 is powered by the secondary battery 404 for the duration of the pre-determined amount of time in the timer 440 before the second relay 444 is triggered to turn off or open the switch 443 to cut off the power to the display panel 456. The exemplary logic of the power management board 420 is to preserve the primary battery 402 to restart the engine of the vehicle; and to prevent excessive draining of the secondary battery 404 with the timer 440. The automated electronic logics can be overridden by a manual reset 412, which may be activated by an operator of the vehicle (e.g., a driver). In one embodiment, the power is turned off as soon as the reset 412 is activated. In another embodiment, when the reset 412 (e.g., a hard or soft button) is activated, an electronic signal (e.g., a pulse) is sent to the display panel 456 to initiate a power off operation.

Further included in the power management circuit board 420 is a light sensor 414 (e.g., Cadmium Sulphide (CdS) photocell light sensor) to convert ambient lights to electrical signals or pulses. The light sensor voltage sampling 432 detects the voltage out of the light sensor 414 and compares to a benchmark voltage 434. If a higher than benchmark voltage is detected, a signal is sent from block 433 to a third relay 446. The third relay 446 turns on and off a third switch 445, which controls the power to the back light 458. For example, the back light 458 is turned on automatically in response to a darker ambient light condition (e.g., evening, early morning, foggy day, etc.)

In another embodiment, illumination intensity of the display panel 456 is adjustable in response to the detected ambient light conditions by the light sensor 414. The power management circuit board 420 may be configured to automatically dim the illumination of the display panels and display plates in a darker environment and brighten in a brighter environment. For example, local city ordinance may only allow a vehicle carrying a display sign in certain brightness level. In another example, a brighter sign is needed in a very bright ambient environment such as downtown or city center area. Changing illumination intensity of the displayed messages may be managed in conjunction with a GPS. The display system is controlled to adjust the display illumination to an acceptable level according to the local rules or regulations. In another case, when the vehicle travels into a local area that prohibits displaying certain messages, based on the location information determined by a GPS, the display system is configured to automatically skip certain messages.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

We claim:

1. A system for displaying messages, the system comprising:
   a bus;
   a display system provided for the bus, the display system including at least a first display panel and a second display panel, the first display panel having a first aspect of ratio and the second display having a second aspect of ratio, the first and second display panels configured to display messages provided from a portable computing device that is removably mounted thereto and synchronized with a base station for updating the messages, wherein the messages include a set of advertising messages;
   the display system further including a media processor configured to process the messages formatted for the first display panel in accordance with parameters of the first and second display panels so that the messages are properly displayed on the second display panel;

a local storage device configured to store default messages, the default messages being displayed when the portable computing device is dismounted from the display system;

a portable computing device being equipped with network capability that allows the portable computing device to communicate wirelessly with the base station, the local storage device, and the displays;

whereby the unique network interconnectivity between display panels, the portable computing device, the base station, and the local storage device are interconnected in a network; and whereby the portable computing device communicates with the base station to receive updated messages for display on the display panels.

2. The system as recited in claim 1, wherein both of the first and second display panels are respectively mounted on both opposite sides of the bus, facing outwards so that pedestrians on both sides of a street see either one of the first and second display panels.

3. The system as recited in claim 2, wherein the display system further includes a control unit controlling a brightness of both of the first and second display panels.

4. The system as recited in claim 3, wherein the control unit operates in responding to a sensor sensing ambient lighting conditions.

5. The system as recited in claim 4, wherein the brightness of the first and second display panels is adjusted automatically to a lower level when the bus enters an area of low lighting condition, the brightness of the first and second display panels is adjusted automatically to a higher level when the bus enters an area of high lighting condition, conversely, when the sensor senses that ambient light is bright, the brightness of the display panels is adjusted high accordingly.

6. The system as recited in claim 1, wherein the first display panel is mounted on outside of the facing outwards while the second display panel is mounted on back of the bus so that pedestrians see identical or different content being displayed on the first and second display panels, and wherein the first and second aspects of ratio are different to fit respective exterior spaces of the bus.

7. The system as recited in claim 6, wherein the display system also includes at least one third display panel mounted inside of the bus for view by passengers, where an aspect of ratio of the third display panel is not identical to either one of the first and second aspects of ratio.

8. The system as recited in claim 7, wherein the third display panel and the first display panel are configured to display identical messages.

9. The system as recited in claim 7, wherein the smaller third panel and the first display panel are configured to display different messages.

10. The system as recited in claim 1, further including a power management system to ensure that the first and second display panels are powered automatically by a secondary battery after the bus is parked for a predefined time.

* * * * *